Oct. 21, 1969     E. H. PHILLIPS     3,473,428
ENTERTAINMENT DEVICE

Filed May 31, 1966     10 Sheets-Sheet 1

INVENTOR
EDWARD H. PHILLIPS

BY *Shoemaker and Mattare*

ATTORNEYS

Oct. 21, 1969 E. H. PHILLIPS 3,473,428
ENTERTAINMENT DEVICE
Filed May 31, 1966 10 Sheets-Sheet 2
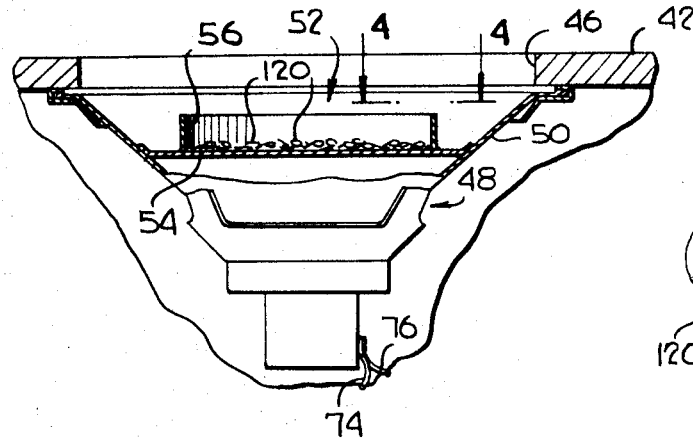
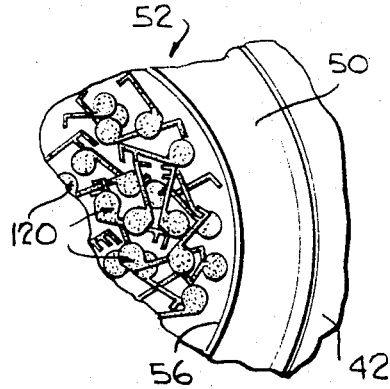
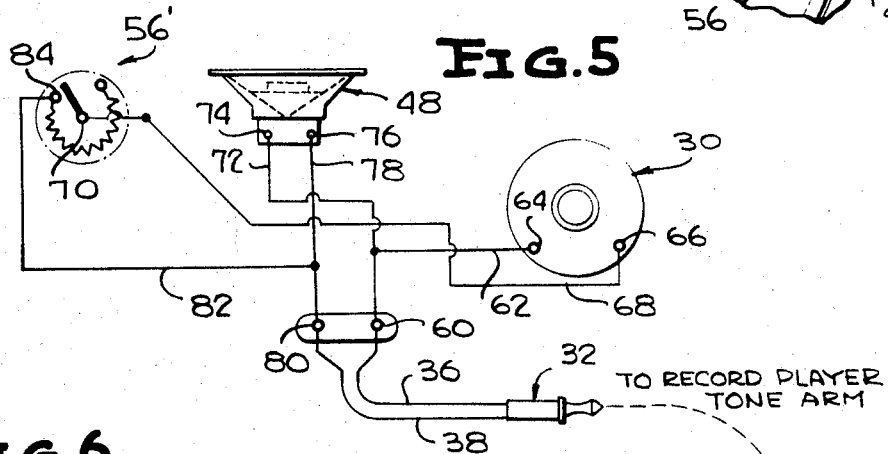
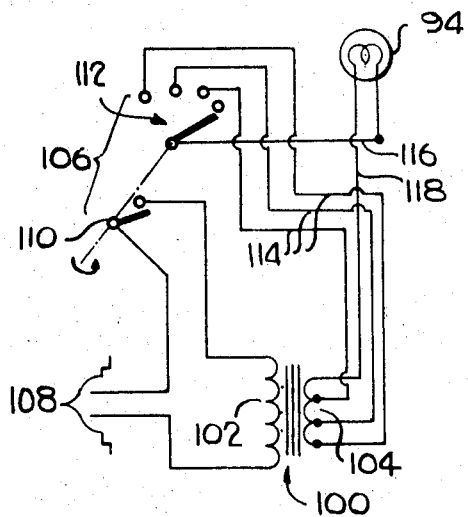
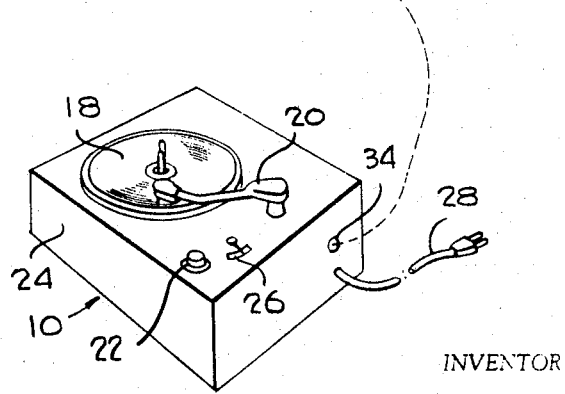
INVENTOR
EDWARD H. PHILLIPS
BY Shoemaker and Mattare
ATTORNEYS

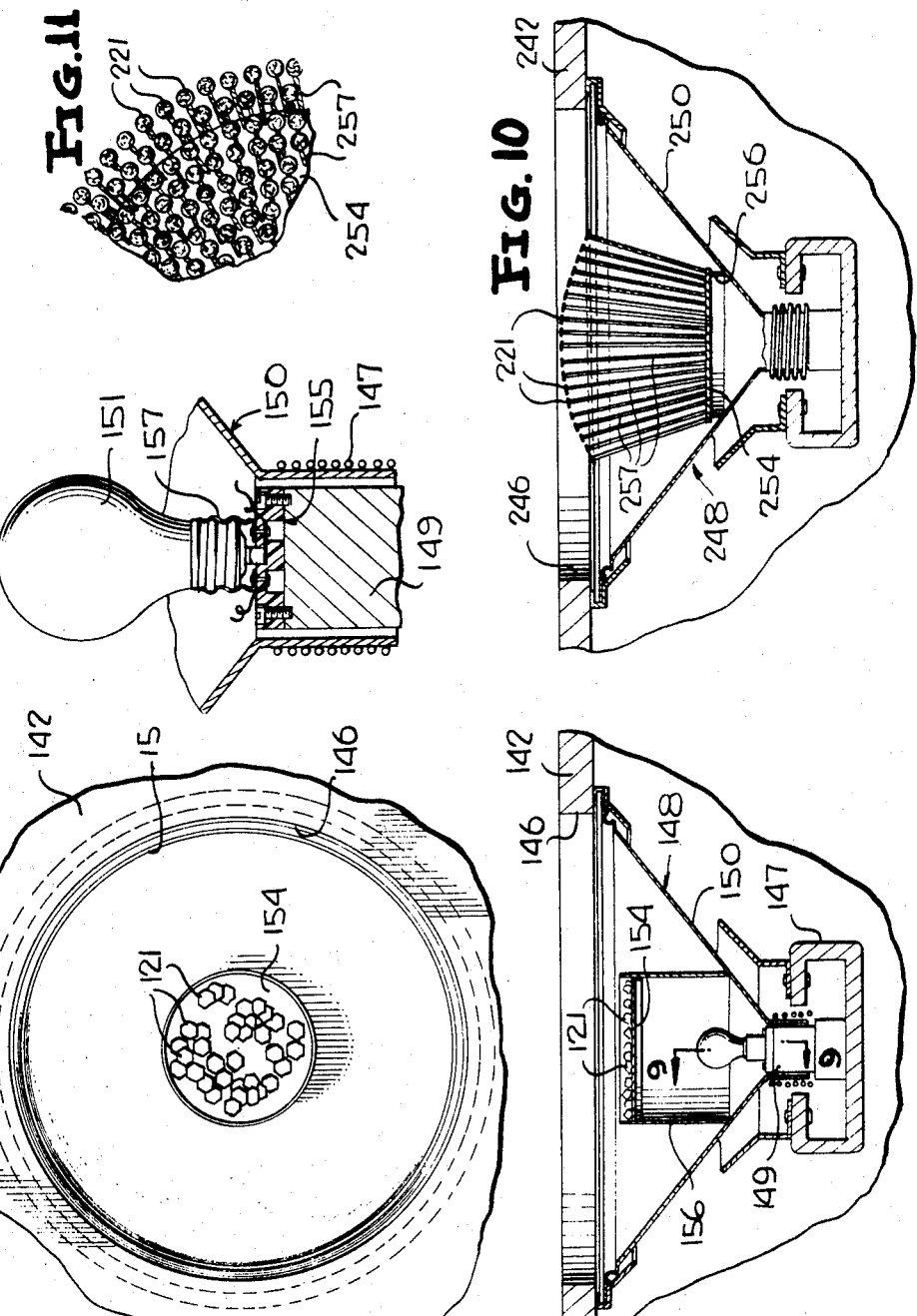

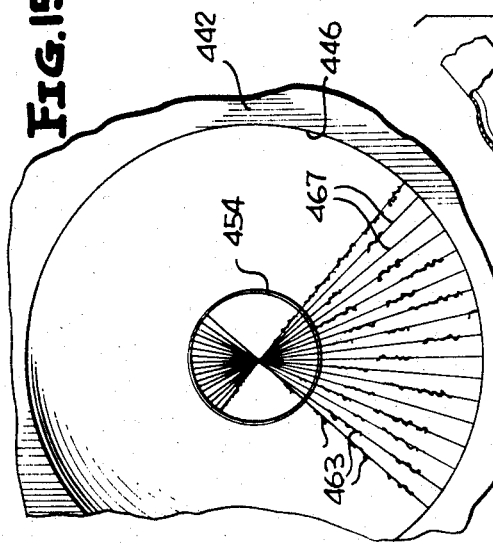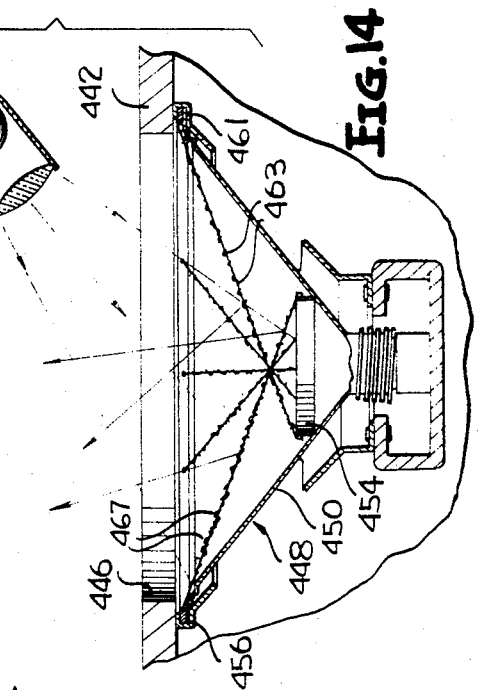

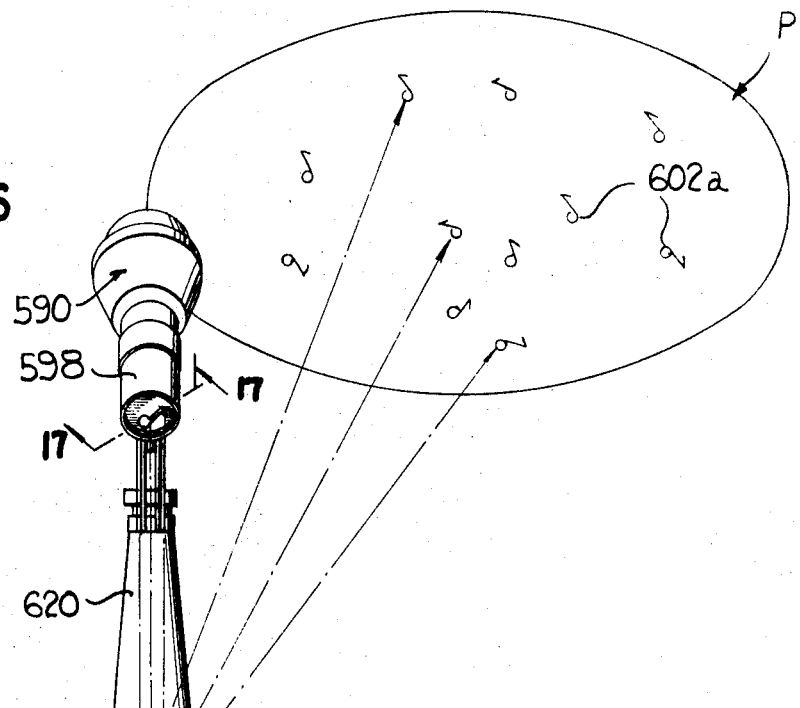
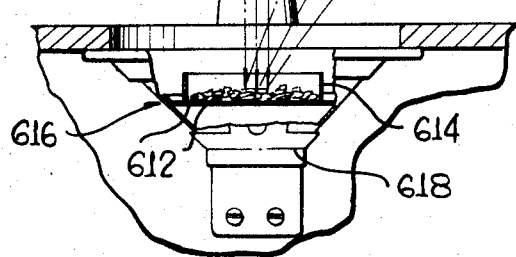
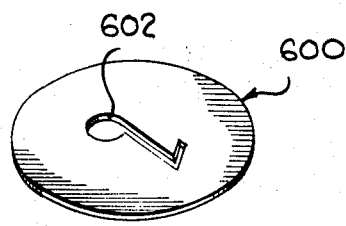
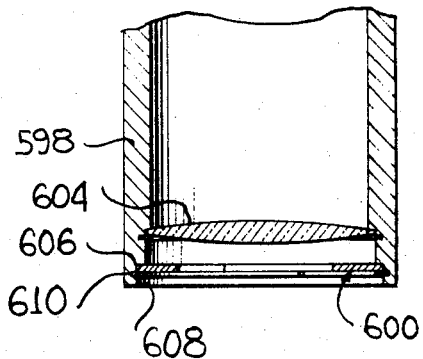

Oct. 21, 1969  E. H. PHILLIPS  3,473,428
ENTERTAINMENT DEVICE
Filed May 31, 1966  10 Sheets-Sheet 6
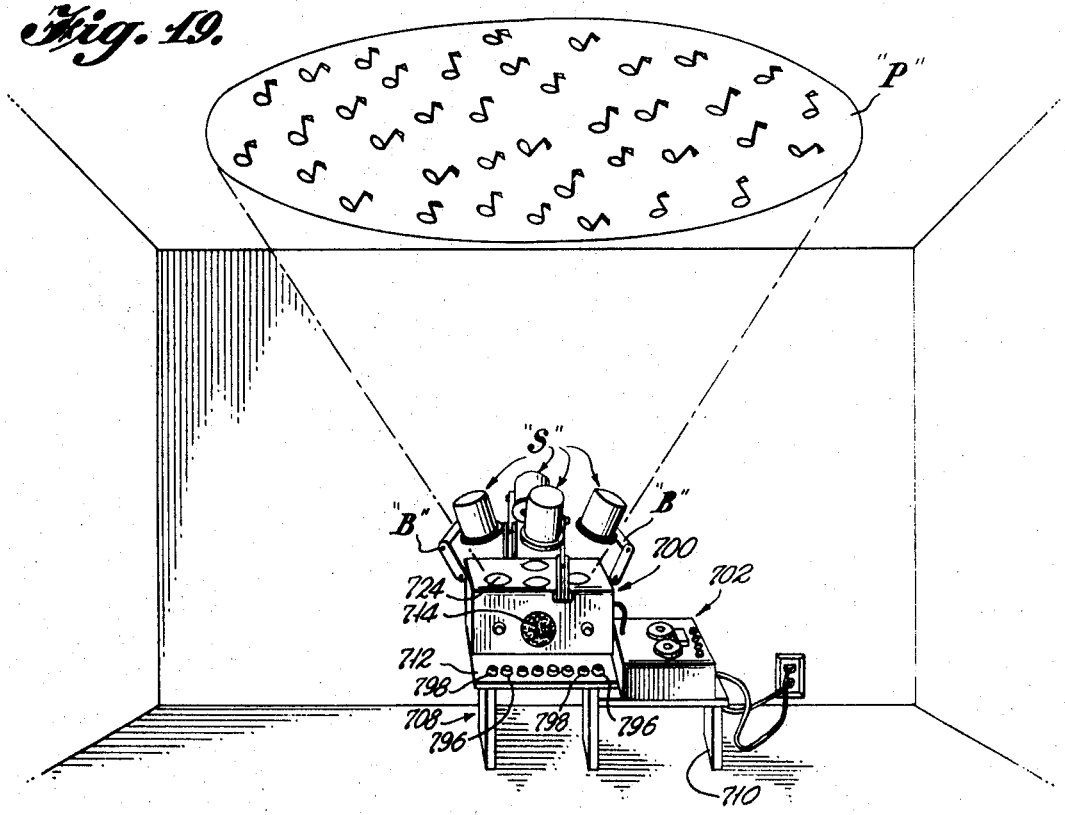
Fig. 19.
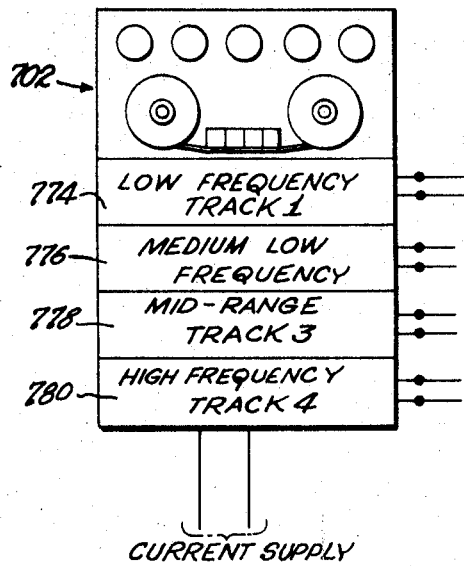
Fig. 20.
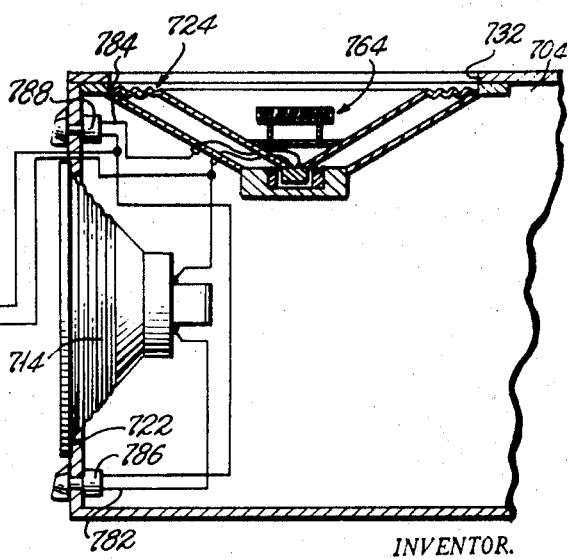
INVENTOR.
Edward H. Phillips
BY
Shoemaker and Mattare
ATTORNEYS Oct. 21, 1969 — E. H. PHILLIPS — 3,473,428
ENTERTAINMENT DEVICE
Filed May 31, 1966 — 10 Sheets-Sheet 7

INVENTOR.
Edward H. Phillips
BY
Shoemaker and Mattare
ATTORNEYS

Oct. 21, 1969     E. H. PHILLIPS     3,473,428
ENTERTAINMENT DEVICE

Filed May 31, 1966     10 Sheets-Sheet 8

INVENTOR.
Edward H. Phillips
BY
Shoemaker and Mattare
ATTORNEYS

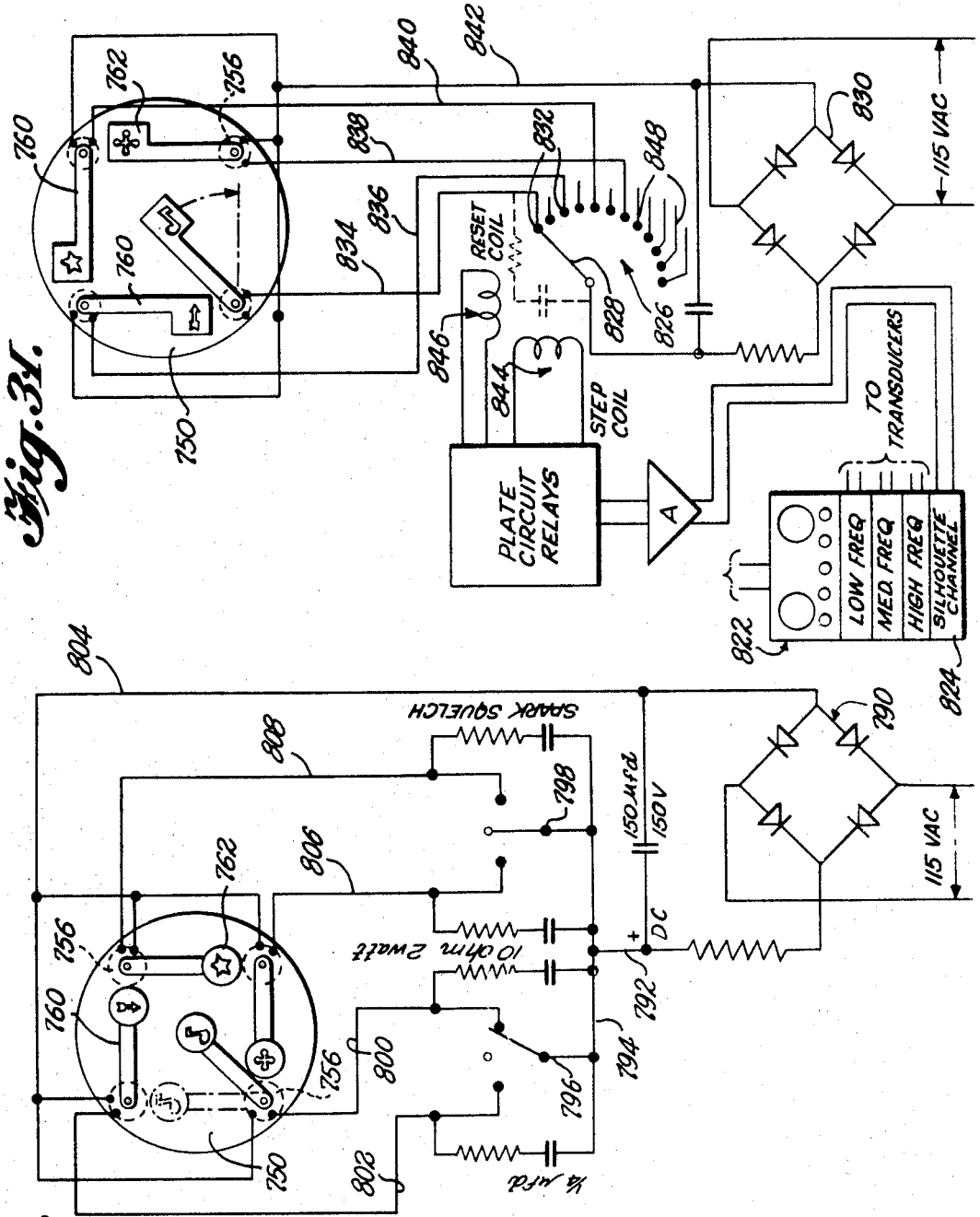

Oct. 21, 1969 E. H. PHILLIPS 3,473,428
ENTERTAINMENT DEVICE
Filed May 31, 1966 10 Sheets-Sheet 10

INVENTOR.
Edward H. Phillips
BY
Shoemaker and Mattare
ATTORNEYS

United States Patent Office 3,473,428
Patented Oct. 21, 1969

3,473,428
ENTERTAINMENT DEVICE
Edward H. Phillips, 108 King George Road,
Bound Brook, N.J. 08805
Continuation-in-part of application Ser. No. 367,289,
May 12, 1964. This application May 31, 1966, Ser.
No. 573,136
Int. Cl. A63j 17/00
U.S. Cl. 84—464                    15 Claims

ABSTRACT OF THE DISCLOSURE

An electrical transducer is connected with a sound reproducing system so as to produce pulsating movements in accordance with the sound of the system. A plurality of light-reflecting elements are supported by the transducer for movement relative thereto in response to the pulsating movements of the transducer. A source of light is beamed downwardly at an angle onto the reflecting surfaces of the elements for projecting images onto a surface. A template is positioned adjacent the source of light so that the light beam has a particular design which in turn is reflected onto the receiving surface.

---

This application is a continuation-in-part of my prior application Ser. No. 367,289, filed May 12, 1964, for Entertainment Device, and now abandoned, which application was a continuation-in-part of my application Ser. No. 328,592, filed Dec. 6, 1963, for Entertainment Device, and now abandoned.

This invention relates generally to the art of entertainment and is directed particularly to a novel device or apparatus whereby visual and audible entertainment, or amusement may be, and are, combined in a novel manner.

A primary object of the present invention is to provide a novel amusement device in which music, musical tones or other sounds, produced by instruments, or otherwise, are reproduced electrically and the electrical impulses accompanying such reproduction are utilized for effecting animation of light reflecting objects onto which a light beam is projected, whereby moving reflections from such moving or animated objects are formed on a surface such as a screen, a wall of a room, or any other suitable medium.

Another object of the invention is to provide a device of the character stated wherein recorded music may be employed for producing the stated animation of the light reflecting objects or particles by means of vibrations produced by electrical impulses.

Another object of the invention is to provide an amusement device by means of which movements of light reflecting objects or particles may be pictured upon a suitable screen or other surface in synchronism with musical sounds produced by conventional sound reproducing mechanism and wherein the movements of such light reflecting objects or particles, and therefore, the movements of the reflections of such particles will change synchronously with the tempo and volume of the music.

A still further object of the invention is to provide an amusement apparatus of the character described whereby music may be reproduced for dancing or for listening entertainment, or both, and at the same time a visual representation of the tempo of the music will be presented.

In the art of entertainment the use of changing lights has a strong appeal to adults as well as children and this is particularly true when such light movements are accompanied by music.

The reproduction of such light movements in synchronism with the tempo of musical works as embodied in the present invention not only provides fascinating amusement but also helps to instill in persons, particularly children, a feeling for tempo or rhythm.

The invention broadly comprises the combining with the sound reproduction system of an electric sound reproducer such as a record player, or a tape recording and reproducing mechanism, of an electrically vibrated surface, such as a tray, upon which is a layer of light reflecting or sparkling elements. The supporting surface for such elements vibrates simultaneously and synchronously with the speaker cone of the reproducing system whereby the light reflecting particles move around in all directions and change their rate of movement in time with the tempo or rhythm of the music being reproduced.

The surface supporting the moving reflecting particles is maintained substantially horizontal and an intense pencil of light is trained on the layer of particles at an angle whereby reflections from the moving particles will be projected upwardly onto an overlying surface such as the ceiling of a room. When the room in which the mechanism is operated is sufficiently darkened, and when the reflecting particles have a definite formed contour or outline, such form or outline of the individual particles will be reproduced on the surface of the ceiling or other light receiving surfaces, and the reproduced reflections or outlines of the particles will move in synchronism with the music being produced.

Instead of the reflecting particles having a formed outline, or contour, which is reflected on the light receiving surface, a design or configuration may be light projected onto the reflecting surface, according to one method of carrying out the invention. The reflections of individual formed or contoured particles are individually sharp and they may be made in different forms such as diamonds, musical notes, animals or other objects and the light projected and reflected designs or forms may also picture different objects or things.

Another object of the invention is to provide a device which can be used in medical diagnosis in connection with sounds produced by organs of a body. As one example, the invention is adaptable to use as an instrument in detecting sound defects such, for example, as faulty valve sounds in the human heart. The invention, by producing light reflections from moving particles in response to sound vibrations having different pitches and tempos, forms a moving picture of such vibrations and movements when the reflections are projected onto a suitable screen and by recording such vibrations or light movements on a motion picture film, the different patterns of the reflections can be photographed and stored as a permanent record for study and diagnosis.

A further object of the invention is to provide a means, in a system of the character hereinabove described, of projecting onto light reflecting elements, particularly designed or formed figures by means of a template or templates through which a light beam is projected, for effecting the reflected reproduction of such figures upon the light receiving surface.

A still further object of the invention is to provide a novel system of the character stated embodying a means for selectively and rapidly changing templates introduced into the beam of light which is projected upon the reflecting particles, such changing and selective introduction of the templatets into the light beam, and removal therefrom, being electrically effected under manual control.

Still another object of the invention is to provide in a system of the character hereinbefore described, a multi-track magnetic tape recording and reproducing mechanism in combination with multiple sound reproduction elements and associate vibratory units controlled by the different sound tracks of the multi-track tape to impart rapid or slow tempo movements to the reflecting particles or movements of intermediate tempo corresponding to the high, low or intermediate frequencies of musical tones or sounds reproduced by the tape recorder.

In addition to the foregoing it is an object of the invention to provide a controlling sound track upon the multi-track magnetic tape, by means of which through suitable electric circuitry and electrical operating units, the different templates will be automatically moved into and out of the light beams from the light projectors synchronously with changes in frequencies produced by musical instruments being played with the templates reproducing at that time on a viewing screen outlines or reproductions of the particular musical instruments being heard.

Many other objects and advantages of the present invention will become apparent from the following description taken in connection with the accompanying drawings, wherein:

FIG. 3 is a view partially in section and taken on the line 3—3 of FIG. 2 and showing the parts on an enlarged scale.

FIG. 4 is a detail view on an enlarged scale of a portion of the vibrator diaphragm, showing one form of reflector element which may be used.

FIG. 5 is a diagrammatic view of the electric circuit which is connected with the record player mechanism and showing the record player unit in perspective.

FIG. 6 is a circuit diagram for the light projector.

FIG. 7 illustrates another manner of supporting light reflecting particles of a transparent character and projecting the light through the transparent supporting tray or window from the underside thereof.

FIG. 8 is a view in top plane of the structure of FIG. 7.

FIG. 9 is a sectional view taken substantially on the line 9—9 of FIG. 7.

FIG. 10 illustrates another method of supporting light reflecting transparent sparkling elements upon which a light beam is projected from above.

FIG. 11 is a top plan view of a portion of the structure shown in FIG. 10.

FIG. 12 illustrates another manner of supporting the light reflecting and sparkling elements and showing the light beam directed thereon from above at one side.

FIG. 13 is a partial top plan view of the structure shown in FIG. 12.

FIG. 14 illustrates another manner of supporting the light reflecting and transparent particles and means for projecting a light beam thereon from above.

FIG. 15 is a view in top plan of the structure of FIG. 14 showing a portion of the sparkler supporting strands.

FIG. 16 illustrates another application of the inventive concept wherein a means is provided for reproducing a multiplicity of reflections of a single character, on a screen, by the use of a single apertured element through which a light beam is projected.

FIG. 17 is a sectional detail on an enlarged scale, taken substantially on the line 17—17 of FIG. 16 showing the note disc secured to the lamp tube.

FIG. 18 is a perspective view of the apertured note disc.

FIG. 19 is a general diagrammatic perspective view showing four speaker and four transducer pairs or combinations together with respective spotlights and changeable templates and a multi-track magnetic tape recorder for controlling the speaker and transducer unit pairs.

FIG. 20 is a diagrammatic detail of one speaker-transducer pair and a four track magnetic tape recording and reproducing mechanism of suitable design together with the showing of one frequency track of the tape recording and reproducing unit electrically coupled with the associate pair of speaker and transducer units.

FIG. 28 is a circuit diagram for controlling the rotary solenoids of one of the four light projectors or spotlights shown in FIG. 19, wherein the energization of the rotary solenoids is under manual control.

Figure 29:
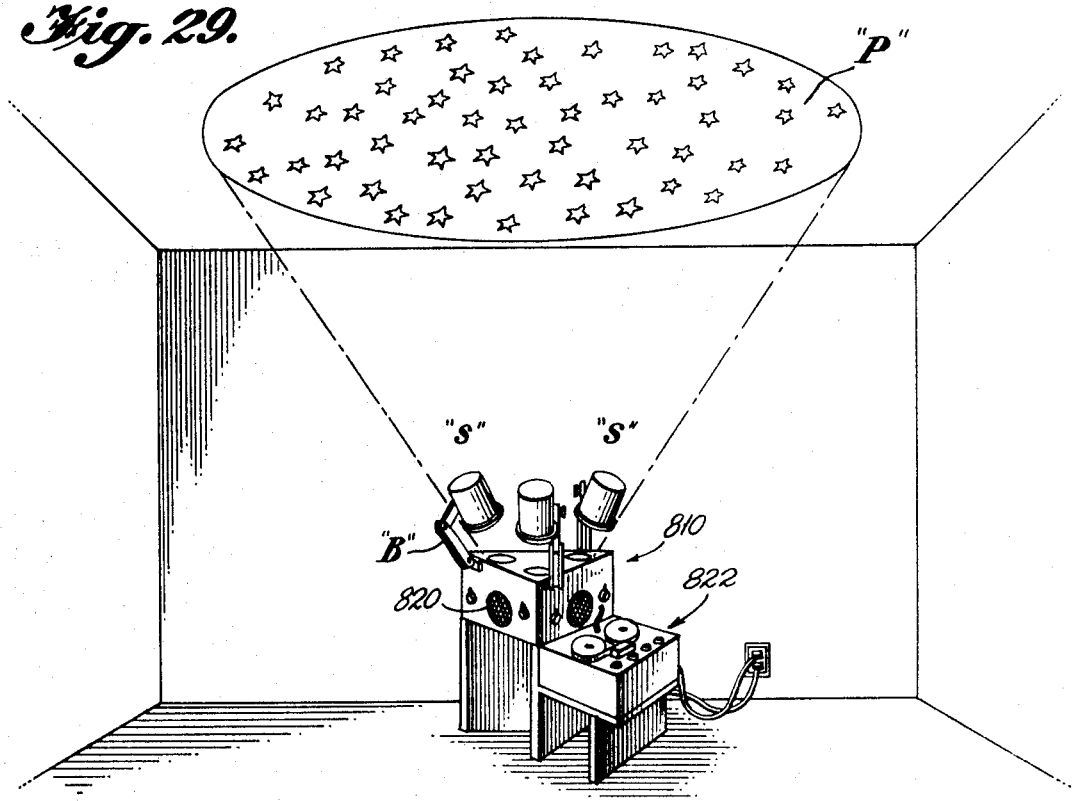

FIG. 29 is a geeneral diagrammatic perspective view showing a modification of the invention using three speaker and three transducer pairs or combinations together with respective spotlights and changeable templates wherein one track of the magnetic tape mechanism functions as a silhouette control in the associated circuitry in substitution for the manual control of the rotary solenoids associated with the four speaker and transducers units or pairs shown in FIG. 19.

Figure 27:
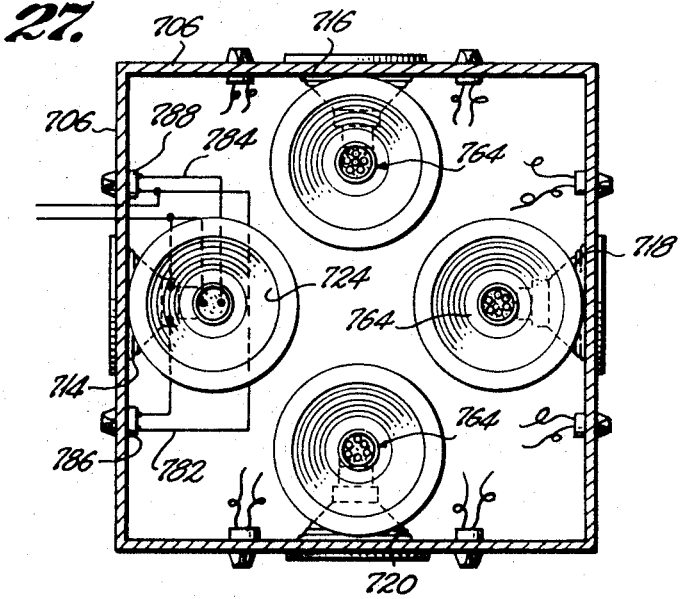
FIG. 27 is a top view of the speakers and transducers in the housing or cabinet of FIG. 19, as seen with the top of the cabinet removed.
Figure 30:
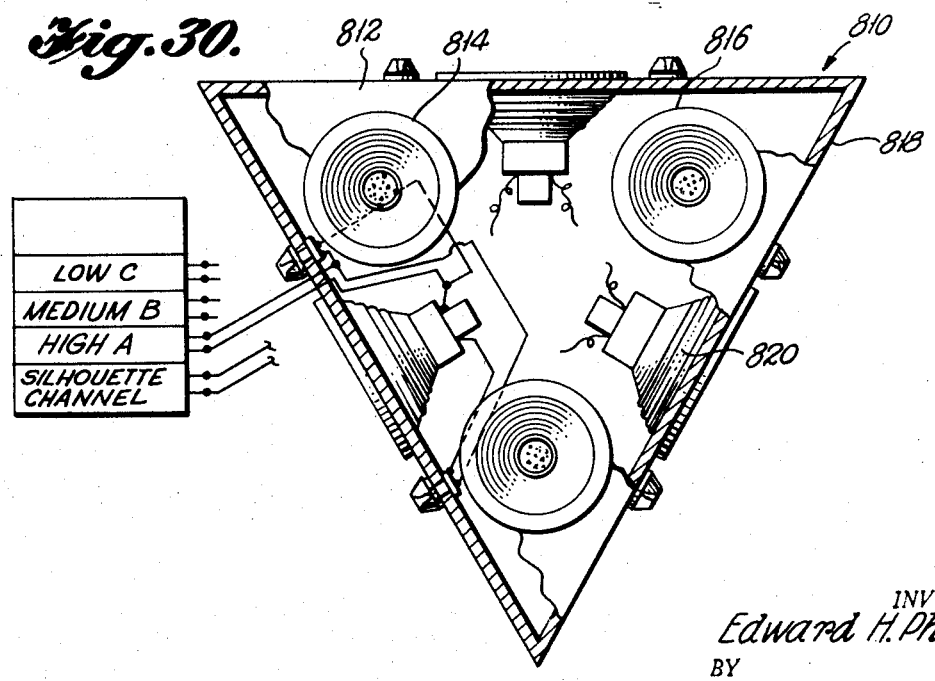

FIG. 30 is a view corresponding to FIG. 27, being a partial top plan and horizontal section of the housing or cabinet shown in FIG. 29 and illustrating a positioning of the pairs of speaker-transducer units, looking down upon the reflector carrying trays supported by the cones of the transducer units.

FIG. 31 is an electric circuit diagram by which may be effected the automatic shifting or moving of the templates under the control of a track, or tracks, forming a part of the tape recording and reproducing unit which simultaneously controls the energization or functioning of the different speaker-transducer pairs.

Figure 1:
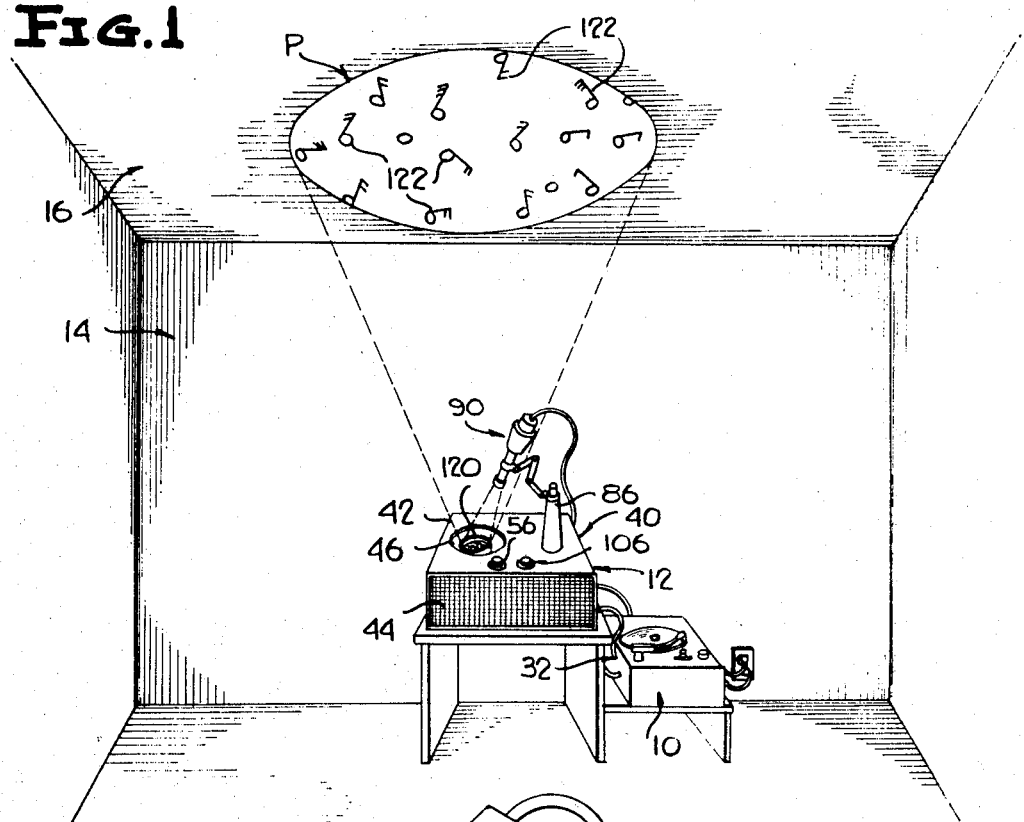
FIG. 1 is a perspective view of the apparatus of the present invention as set up in use and illustrating, or showing, reflections of the animated particles projected onto the ceiling of a room.
Figure 2:
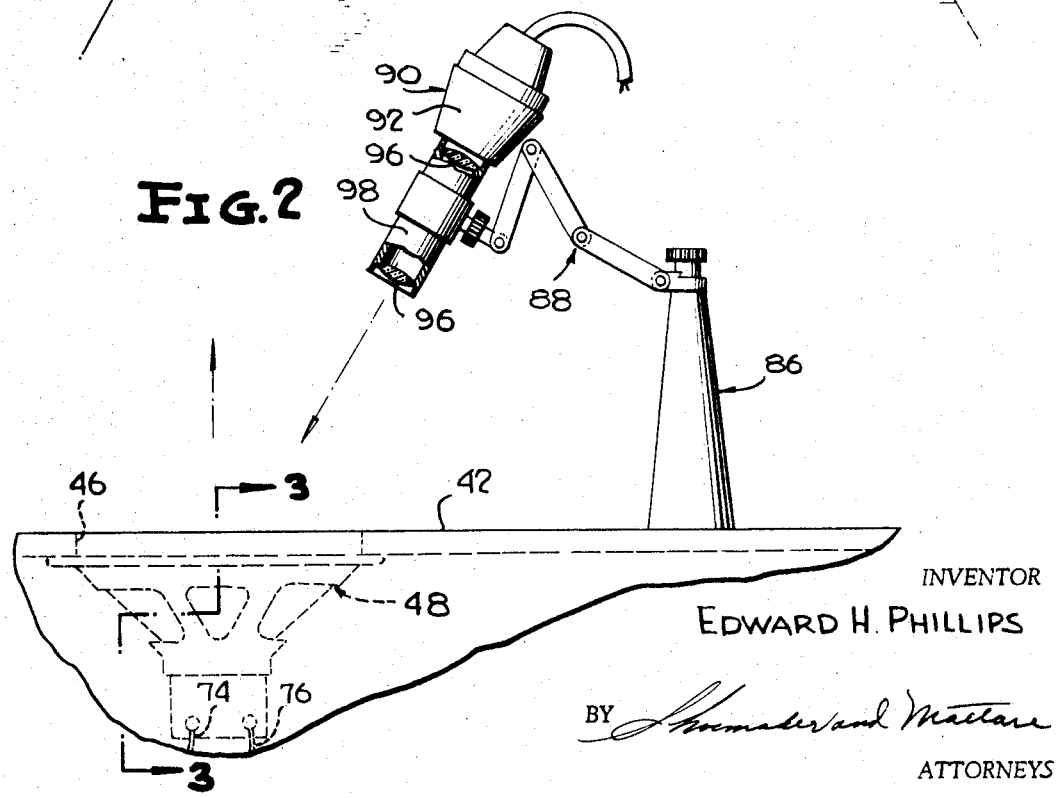
FIG. 2 is a view in side elevation and on an enlarged scale of the light projector and its association with the vibrating diaphragm, portions of the reflector being in section.

Referring now more particularly to the drawings, FIG. 1 illustrates one form of apparatus set-up whereby the objects of the present invention may be realized. In this figure are illustrated phonograph record playing means, generally designated 10, and a unit 12, with which are associated the hereinafter described elements which function to reproduce or project on a suitable receiving, or viewing, surface, such as the ceiling of a room, the animated light reflections.

The numeral 14 generally designates any suitable type of enclosure such as a room or the like wherein there is a surface, here shown as the room ceiling 16, onto which the animated reflections may be thrown and caused to move in time with the tempo of music produced from the source, such as the record player 10.

While in this FIG. 1 the record player 10, or other suitable music producing means, and the unit 12 are shown together, it will be understood that the music producing means 10 may be at any other suitable location removed from the unit 12 and out of the view of persons in the room in which the light animations are produced.

The record player 10 may be of any standard or conventional make, having the disc supporting turntable 18, the tone arm 20, control switch 22, for turning on and off the electrical current supply to the turntable operating motor and to the conventional amplifier means, not shown, enclosed within the cabinet or box 24.

There may also be the usual speed change means 26 for controlling the speed of rotation of the turntable 18 in accordance with the type of record being used.

Numeral 28 designates a conventional current conductor which may be connected with any suitable source of electric current supply.

The electrical impulses originating at the pickup head of the tone arm 20, in the conventional manner, are, of course, amplified in the conventional manner by the amplifier unit, not shown, contained in the cabinet 24 and carried to the speaker element 30. While the speaker element 30 may be retained in the cabinet 24 with all of the other elements about to be described, it is preferred that the element 30 be housed, with other elements, in and make up the unit 12. Accordingly, there is here illustrated a conventional phone jack plug 32 which may be introduced in a suitable opening in a wall of the cabinet 24, at 34, for electrical connection with a conventional phone jack, not shown, located within the cabinet 24 and connected with the amplifying unit in the cabinet for conducting the tone arm amplified impulses by way of the conductors 36 and 38 to the speaker 30 and the other illustrated elements, combined in the unit 12.

The unit 12 is illustrated as including a cabinet 40 having the top wall 42 and a grille front 44.

The top wall 42 is provided with the opening 46 for the purpose hereinafter described.

Mounted within the cabinet 40 behind and facing the grille front 44 is the speaker element 30. Associated with this element is a transducer unit 48 in the form of a speaker which is secured to the underside of the top wall 42 of the cabinet 40 concentrically with the opening 46 and within the cone 50 thereof facing upwardly through the opening 46.

As illustrated the opening 46 is uncovered so that a light beam projected downwardly through the opening as hereinafter described, will fall upon the cone and the reflecting particles supported thereby.

The transducer cone 50 has positioned therein, a tray 52. This tray is here illustrated as consisting of the disc 54 secured at its periphery to the surface of the cone 50 and carrying upon its top surface the low upstanding wall 56 which thus forms the receptacle or pan of the tray.

The numeral 56' designates the control rheostat for the voice coils of the transducer and speaker. This rheostat is shown in FIG. 1 as being mounted in the top wall 42 of the cabinet 40 and is accessible for controlling the volume of sound issuing from the sound emitting speaker 30 and for controlling the intensity of vibration of the transducer cone 50 of the cone of speaker 48.

As illustrated in the circuit diagram, one of the conductors running from the plug 32, as, for example, the conductor 36, is connected to a terminal 60 and this terminal is connected by way of the current conductor 62, with one of the terminals of the sound emitting speaker 30 as indicated at 64. The other terminal of the speaker 30, designated 66, is connected by the current conducting wire 68, with the center post 70 of the rheostat 56. There is also connected to the conductor 62, the conductor 72, which leads to one terminal, designated 74, of the cone 50 of the unit 48.

The other terminal of this unit 48, which terminal is designated 76, is connected by the current conductor 78 to a terminal 80, with which the other wire or lead 38 of the plug 32 is connected and the wire 78 is also connected by means of the wire 82, with the terminal 84 of the resistance element of the rheostat 56.

The terminals 60 and 80 may be carried by the cabinet 24 to be accessible from the exterior of the cabinet so that the wires 36 and 38 may be readily attached thereto.

Mounted upon the top wall 42 of the cabinet 40 is a post 86. This post supports, by means of an articulated arm 88, a light projector 90. The projector 90 embodies a housing 92 in which are encased an incandescent lamp 94 and the lenses 96 in spaced relation to the projector tube 98. This light projector unit is designed to throw a small spot of light into the tray 52 as illustrated and for the purpose hereinafter described.

The sections of the articulated arm 88 are frictionally pivotally coupled together whereby the sections may be pivoted one relative to the other to set the spotlight or to throw the spot of light into the tray.

Enclosed in the housing or cabinet 24 is a step-down transformer 100, the primary and secondary coils of which are designated respectively 102 and 104.

A dual switch 106 controls the flow of current from the supply line 108, to the primary coil of the transformer and to the incandescent lamp 94. One element of the dual switch, designated 110, opens and closes the circuit through the transformer, while the second element of the dual switch, which is designated 112, takes current from the different taps of the transformer secondary coil, by way of the conductors 114, feeding the current into the lamp 94 by way of the one conductor 116, to the transformer. Thus the different degrees of light intensity can be had by means of the switch unit 112.

In the operation of the apparatus of the present invention in the embodiment so far described, the apparatus is set up in a suitable enclosure such as a room where an overhead surface may be provided which will function as a screen.

The tray 52 has loosely placed therein a layer of shiny light reflecting particles 120. These particles may be in the form of small triangular sections of silver foil or other suitable highly polished light reflecting and/or sparkling material, or the particles may be substantially flat and in the form of music notes or any other form.

The light projector 90 is set or positioned so that the lens tube will be aimed down into the open top of the tray to project a spot of light onto the particles and when the apparatus is set up a darkened area, the form or outline of the particles individually will be reproduced by reflection onto the overlying picture receiving surface.

In FIG. 1 such an area is shown and designated generally by the reference character P. This picture area will include the reflected outline of each of the different particles as indicated at 122.

When a music record is placed on the turntable 18 and the machine is started, or when other electrical apparatus is employed, to activate the sound speaker 30 so as to reproduce music from the record or other apparatus, the vibrations produced in the cone of the speaker 30, which result in the air movements which produce the audible musical sounds, will be repeated or reproduced, or produced simultaneously in the cone 50 of the small speaker or transducer unit 48.

The vibratory movements produced in the diaphragm 50 by the speaker coil of the transducer unit 48, will produce the same movements of the particles 120 which are in the tray 52 and accordingly the reflections of the particles received in the picture area P will move about over the picture area in the same tempo as the movement of the cone 50 and therefore in the same tempo as the music produced by the speaker 30. As the movement increases or decreases in tempo the movements of the particles will follow suit and the reflections of the particles in the picture area will do likewise. Also as the volume of the produced sound increases and decreases, the movements of the particles will become more-or-less violent or agitated.

FIGS. 7 to 15 inclusive illustrate other ways of supporting and illuminating the light reflective and/or transparent particles. In these figures the transducer speaker structure is somewhat diagrammatically illustrated and may be either a permanent magnet or an electromagnetic dynamic speaker of conventional design.

FIG. 7 illustrates a speaker structure, or transducer, in vertical section, such structure being indicated as a whole by the reference character 148 and as will be readily apparent, this speaker structure corresponds to the speaker element or speaker structure 48 by means of which the reflective and/or transparent particles are agitated.

The cone of the speaker 148 is designated 150 and is secured, like the cone 50, to the underside of the cabinet top wall 142 below the opening 146.

The numeral 147 designates the speaker voice coil and the numeral 149 designates the stationary core of the speaker magnet.

In this second embodiment of the invention, the speaker cone 150 supports upon the inner surface and in concentric relation therewith, an upstanding lightweight tube 156 which may be of paper or any other suitable material and and there is secured in the top end of the tube a transparent window 154. This window is placed slightly below the top edge of the tube so as to form with the tube a tray in which are placed the multiplicity of transparent and sparkling particles 121. These particles may be formed of cut glass pieces and may be of diamond form or of any other desired form or transparent prisms.

FIG. 9 is a vertical section on an enlarged scale of the upper end of the magnet core 149 and of the voice coil 147 and the apex portion of the speaker cone around which the voice coil is wound in the conventional manner.

The top end of the magnet core 149 has means mounted thereon for the support of an incandescent lamp which is designated 151. Such mounting means may be in the form of a body 155 of insulation material, upon which is secured the lamp socket 157, to the center and shell terminals of which, electrical current conductors may be attached in the usual or conventional manner as here illustrated.

With this construction of the supporting means for the reflective and transparent particles it will be seen that the light from the lamp 151 will be projected upwardly through the transparent window 154 and the desired movements of reflections from the particles will be produced on an overlying screen or other surface when the speaker is connected into the electrical system illustrated in FIG. 5, in place of the speaker element 48 there shown.

FIGS. 10 and 11 illustrate a third means of supporting reflective and/or transparent particles or other bodies to be agitated by movements of a supporting speaker cone. In these figures the speaker unit or element is generally designated 248 and the speaker cone is designated 250.

The speaker cone is secured to the underside of the cabinet wall 242 to cover the opening 246.

The cone 250 has mounted therein a circular platform 254, of suitable lightweight material such as paper, the periphery of the platform 254, being attached to the body of the cone in a suitable manner as indicated at 256.

The platform has attached thereto a multiplicity of upstanding flexible antenna 257. These may be formed of a suitable heavy type of cord having sufficient stiffness to maintain its upright position in the manner illustrated. The lower ends of the antennae are glued or otherwise secured to the platform and the lengths thereof are graduated so that the top ends substantially conform to an arc. The various antennae are set close together on the circular platform surface and they fan out as shown in FIG. 10.

The top ends of the antennae carry clusters of sparkling elements or reflecting elements which are designated 221. Such sparkling elements may be attached or applied to the top ends of the antennae in any suitable manner. One manner of attaching the sparkling elements would be to dip the ends of the individual antenna into an adhesive and then into a quantity of small sparkling or light reflective particles so as to form "heads" on the top ends of the antennae.

In the employment of the arrangement shown in FIG. 10, it will be understood that a light beam will be projected from above onto the heads or top ends of the antennae and onto the sparklers carried thereby.

FIGS. 12 and 13 illustrate a further embodiment of the invention or method of supporting the light reflective and sparkling elements. In these figures, the speaker structure is generally designated 348, the speaker cone being designated 350. The numeral 342 designates the cabinet wall in which the opening 346 is formed and beneath which the cone 350 is mounted.

In the lower part of the cone there is mounted the ring or annulus 354 which is maintained upon the body of the cone or diaphragm, and concentric therewith, by a suitable attaching means such as the annular band 356 which rests on the cone and to the top edge of which the ring is attached.

Of course, other means may be employed for attaching the ring to the cone if desired.

Disposed at an elevation above the cone is the upper ring 358.

The upper ring 358 is supported above and concentrically with the cone and with the lower ring 354, by the arms 359. These arms are secured at their lower ends, in a suitable manner, to the periphery of the cone or to the frame 361 which forms a part of the speaker structure and by means of which the speaker structure is attached to the underside of the wall 342. The arms 359 converge upwardly to the upper ring 358 and this upper ring is preferably of larger diameter than the lower ring 354 as shown.

The lower ring 354 has secured thereto a multiplicity of threads or strings 363 and these threads or strings extend upwardly in slightly diverging relation as shown, and are attached at their upper ends to the ring 358, by short lengths of elastic band 365. The short lengths or pieces of elastic band 365 thus draw the strings relatively taut but, as will be readily apparent, the strings may be moved or agitated slightly by the vibrations from the speaker cone so as to keep in motion the transparent particles 367 which may consist of minute pieces of crystal such as glass or of shiny plastic or other shiny and light reflecting material. With this latter structure the light may be projected onto the cone of threads from a suitable source, such as that illustrated and generally designated 367.

FIGS. 14 and 15 illustrate still another arrangement of light reflecting and/or sparkling elements. In these figures the reference numeral 448 generally designates the speaker element and the reference 450 designates the cone or speaker diaphragm. In this latter arrangement the speaker cone supports, in the lower portion thereof, the ring or band annulus 454 and at the top edge of the cone there is secured the ring 456 which is attached to the frame 461. This frame, as in the previous structures, is attached to the underside of the cabinet wall 442 with the cone facing upwardly through the wall opening 446.

The band 454 and ring 456 have stretched between them the elastic threads or cords 463, each of which extends from a side of the ring 456 downwardly and across to the far side of the band 454. Thus the multiplicity of elastic threads converge in a conical arrangement above the center of the slower band 454 as illustrated in FIG. 15.

These elastic threads have secured to them a multiplicity of sparkling elements 467 and in this structure as in the structure shown in FIG. 12, it will be seen that when the speaker cone vibrates, the elastic threads will be set in vibrant motion and light beams projected from a wide angle incandescent lamp lens, suitably located above the sparkler carrying threads, will cause reflections to be thrown from the particles 467 upwardly onto a screen or other suitable surface.

Another method or manner of carrying out the present invention is illustrated in FIGS. 16 to 18.

In the different embodiments of the invention or the different ways of carrying out the inventive concept, as hereinbefore described, the animated figures on the light receiving screen or surface are produced by projecting a pencil beam of light onto a multiplicity of light reflecting particles, discs or the like having different shapes or configurations. The light reflected from these different particles or discs is reflected in the form or shape of the particle or disc on the screen.

In the embodiment of the invention illustrated in FIGS. 16 to 18, the light beam is projected onto reflecting discs or particles in the form, shape or configuration which is to be reproduced on the screen and the light beam in the form or configuration first strikes the reflecting discs and is then reflected therefrom. By employing this embodiment a single element is used and is interposed between the light source and the reflecting discs or particles. Such element may be defined as a template in which the outline of the desired figure to be reflected, is cut.

Referring now to FIG. 16, it will be seen that the light projector here designated 590, corresponding to the projector 90 hereinbefore described, has the lens tube 598 carrying the template element through which the light is projected and which is cut or apertured in the desired manner to produce on the light receiving screen, a multiplicity of reflections of the desired figure or design.

This manner of reproducing on the light receiving surface or picture area, here designated P', the reflections of the desired configuration or design, might be likened to the operation of a pin-hole camera in reverse in that a light source is placed behind and close to the body having the small opening or aperture therethrough and is projected through such aperture onto a receiving surface.

For carrying out the invention according to the presently described embodiment there is provided a disc or plate 600 which may be formed of thin metal, light cardboard or any other suitable opaque material and this disc or plate is cut out in the form of the figure or design desired to be projected. In the present illustration the disc 600 has been cut out to form an opening 602 in the shape or design of a musical note. This is merely illustrative, however, as it is to be understood that the cut out or opening may be of any desired shape or design.

The aperture disc or template 600 is secured against the light emitting end of the projector tube 598, in any suitable manner, and, of course, in advance of the lens 604 in the tube.

It is desirable that the template disc 600 be secured or held in position over the end of the light tube by a means which facilitates its ready replacement so that changes may be made in the designs reproduced on the picture area easily and quickly.

One such means of holding the template disc in desired position of the end of the light tube might be as here illustrated which comprises forming a suitable annular recess 606 in the end of the wall of the tube, into which the template disc may be placed to be retained in position by a snap ring 608 which would engage in the annular channel 610 formed in the inner surface of the tube in advance of the recess to thereby hold the template disc in position. This is merely illustrative of one way of holding the template disc in place but it will be readily apparent that other means might be devised for doing this. For example, a very simple manner of holding the disc in place would be by the use of strips of transparent adhesive tape of plastic such as the well known type of adhesive known as "Scotch Brand" tape.

As illustrated, the light passing through the aperture 602 of the template disc is projected onto reflecting sequins or platelets 612 lying in the tray 614 which is supported in the same manner as the hereinbefore described tray, namely, upon the inner side of the speaker cone of a speaker element. Such cone is here generally designated 616 and the speaker element as a whole is designated 618.

It will be understood that the aperture or opening 602 in the form of the musical note or other design, is a very small or extremely small opening and that a very narrow or slender light beam will be formed by the light passing therethrough, which light beam emitted from the opening is here designated 620 and as the flat reflecting particles, discs or sequins are moved around by the vibrating speaker cone they will rapidly fall into positions to pick up and reflect the beam 620 so that a multiplicity of such reflected beams or a multiplicity of beams in the configuration of the aperture of the template will be reproduced on the picture area as indicated at 602a.

In the preceding description and illustration of the invention the music or sound producing mechanism employed for effecting agitation of the light reflecting particles is disclosed as a conventional disc record player associated with a single agitating or transducer unit and a single light unit by which a beam of light is projected upon the particles in the tray carried by the transducer unit.

Effective use may also be made of a tape recording and reproducing apparatus for activating a number of different speakers and transducer units. Also such a tape recording mechanism is employable, as hereinafter set forth, for activating the different speakers and transducers selectively whereby high frequency currents from sound tracks may activate the transducers to move the reflecting elements in one tempo while another sound track may function to activate the transducer unit or units to activate the reflecting elements at another tempo.

In connection with the tape record activating means, manual means is also disclosed for changing the form or character of the light figures projected upon the reflecting elements and means is also disclosed for utilizing a track or a number of tracks or parts of tracks of the tape recording and reproducing mechanism for controlling electric circuitry by means of which the different light configurations or silhouettes projected onto the reflecting particles, will be changed automatically.

FIG. 19 of the drawings illustrates a multiple speaker and transducer apparatus together with multiple light projectors connected with a multi-track magnetic tape recording and reproducing apparatus such as is diagrammatically illustrated in FIG. 20 with electrical connections between at least one frequency track of the tape and the voice coils of a speaker-transducer pair or combination.

In the apparatus disclosed the numeral 700 generally designates a housing or cabinet in which are mounted the speaker-transducer pairs or combinations hereinafter more particularly described.

Also shown in this FIG. 19 is a magnetic tape recording and reproducing apparatus generally designated 702 which may be of any form or construction suitable for activating the several units of the invention encased in the housing 700. This tape recorder and reproducer is of a design capable of recording and reproducing music or other sounds from four or more tracks or wherein a track or tracks may be embodied with the sound reproducing tracks, capable of activating certain electrical units other than units of the speaker-transducer pairs, as hereinafter described.

In accordance with the phase or embodiment of the invention now to be described the housing or cabinet 700 provides an enclosure which may have either a square or rectangular form or configuration with a top wall 704 and four or more side walls 706. In FIG. 27 the four side walls of the housing are shown for the purpose about to be described. In the perspective view forming FIG. 19, however, the housing or cabinet is shown supported upon a suitable base 708 while the numeral 710 illustrates a support for the tape recording mechanism.

The numeral 712 generally designates a conventional control panel carrying control switches or buttons as hereinafter described.

In accordance with the embodiment of the invention now to be described there are provided, instead of a single music or sound reproducing speaker and a single transducer associated therewith, four separately activated speaker units and four transducer units each associated with or accompanying a speaker unit to be electrically activated simultaneously with and by the same electrical impulses fed to its associate speaker from a sound track of the controlling record tape.

The sound reproducing or speaker units are in this setup, here shown as four in number and are designated 714, 716, 718 and 720. Each of these is mounted in an opening 722 (FIG. 20) in one of the four walls 706 of the cabinet, with the major portion of the unit within the cabinet and the cone portion thereof facing outwardly in the customary or conventional manner.

Each of the four speaker units has a transducer unit associated with it to form the desired speaker-transducer pair or combination. One of these transducer units, which are four in number, is designated 724. They are, of course, conventional speaker units which do not, however, produce sound but are employed solely for agitating the light reflecting elements as in the first described embodiment of the invention.

The top or top wall of the cabinet is provided with the four openings 732, each of which is adjacent to a speaker unit and has one of the transducer units set therebelow, with the open or uncovered cone facing upwardly.

Associated with the four transducer units are four light units or spotlights S which are mounted to be positioned above the cabinet and are directed downwardly toward their respective transducer units as illustrated in FIG. 19.

These four light projectors or spotlight units are designated S. When the entertainment device is set up in a room such as that illustrated, the spotlight units may be mounted in any suitable manner as, for example, upon articulated bracket arms B, preferably secured to the cabinet, as shown. The units are angled or inclined so as to project light rays downwardly at the proper angle so that the light beam from each spotlight unit will be directed into the center of an associated underlying transducer unit as will be readily apparent from the illustration of FIG. 19.

Figure 22:
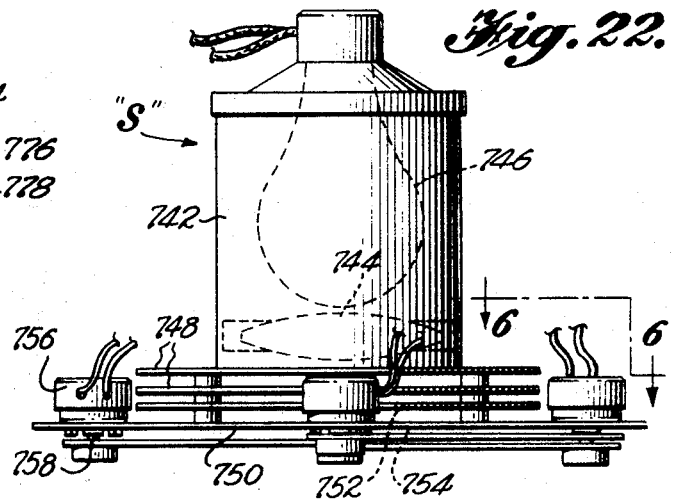
FIG. 22 is a view in side elevation of a spotlight structure with which are associated four rotary solenoid template shifters or actuators.
Figure 23:
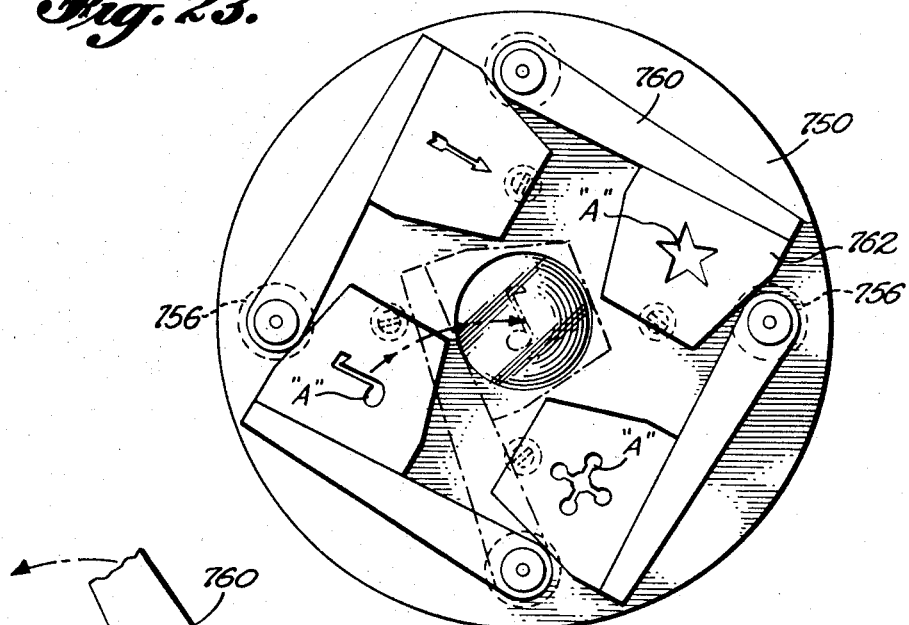
FIG. 23 is a view looking at the front or face of the rotary solenoid and template carrying plate of the spotlight structure, showing in broken outline one of the template arms and the template carried thereby moved into operative position.
Figure 24:
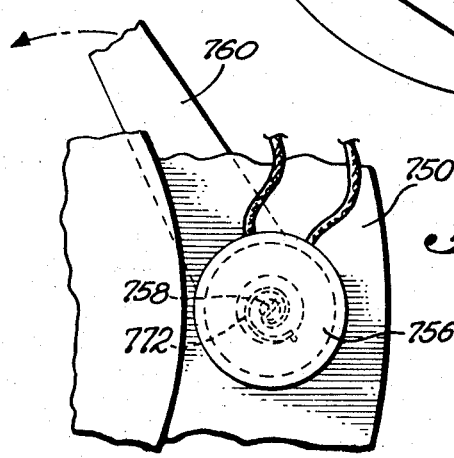
FIG. 24 is a view on an enlarged scale of the rotary solenoid for one template.

FIGS. 22, 23 and 24 illustrate details of one of the four spotlight units S. All of the units S are, of course, preferably of the same construction as the unit of FIG. 22.

The spotlight unit S comprises a suitable lamp housing 742 having an open lower end in which is mounted a lens 744. The numeral 746 generally designates an incandescent lamp of any suitable character.

Secured to the bottom end of the lamp housing 742 are vertically spaced cooling or heat dissipating plates 748, the lowermost one of such plates, which is designated 750, being of larger diameter than the plate 748 as shown in FIG. 22. The several cooling or heat dissipating plates 748 and the plate 750 are provided with light passing apertures 752 and 754 respectively.

Mounted upon the top side of the lowermost apertured plate 750, outside the perimeters of the plates 748, are four rotary solenoids, each of which is designated 756. Each of these solenoids has a shaft which extends downwardly through the plate 750 to the underside thereof, the shaft being designated 758 and secured to each shaft 758 is one end of a template carrying arm 760 at the outer end of which is secured the thin metal template 762 which projects horizontally from the arm in a plane parallel with the plate 750.

Each of the arms 760 has the thin template 762 secured to its inner side which is the side of the arm nearest to the opening 754 in the plate 750, as shown in FIG. 23. The plates 762 are so disposed that upon the swinging of their respective arms 760 in one direction upon energization of the actuating rotary solenoid, the template will be moved into covering position with respect to the light openings 752 and 754. Thus, when a beam of light is projected through the openings with one of the templates in covering relation therewith, the light will pass through a silhouette forming aperture or opening formed in the template. Such aperture for a template is generally designated A and, as shown in FIG. 23, each of the silhouette forming apertures may be of a design or configuration different from the other ones.

In FIG. 23 it will be seen that one of the templates or silhouette plates has a star aperture therethrough while another one has an arrow formed therein and another has cut therein an aperture in the shape of a music note, while the fourth is a four-armed aperture which may represent any design such as that of a snowflake or the like.

The rotary solenoids 756, by means of which the silhouette carrying or forming templates 762 are shifted into and out of the path of the light beam, is of a standard well known make, such, for example, as that manufactured under the tradename of "Ledex" which instrument is manufactured by Ledex, Inc. of Dayton, Ohio, under Patent No. 2,496,880.

As illustrated in FIG. 19, the four light beam projectors are mounted above the cabinet or housing 700 carrying the speaker-transducer combinations or pairs and are disposed at an angle to have the beam projected into the center of the associated transducer and when the lights are energized and one of the silhouette forming templates 762 is placed in the beam, the silhouette design will be reproduced upon the hereinafter described reflecting elements supported in the cones of the transducers or in the cone of the transducer which is directly in line with the light beam and the reflected silhouette will then be projected upwardly onto the ceiling or viewing screen overhead. By suitable disposition of the transducers as to angular position, the reflected light beams or silhouettes will be reproduced upon the ceiling or screen area within a more or less definite or picture area such as that designated P.

Each of the transducer cones has mounted therein, a tray 764, such as the tray 52 hereinbefore referred to, for supporting a multiplicity of reflector elements of the character about to be described, from which will be reflected into the picture area P, reproductions or pictures of the form or design of the silhouette aperture through which the light beam has passed.

Figure 25:
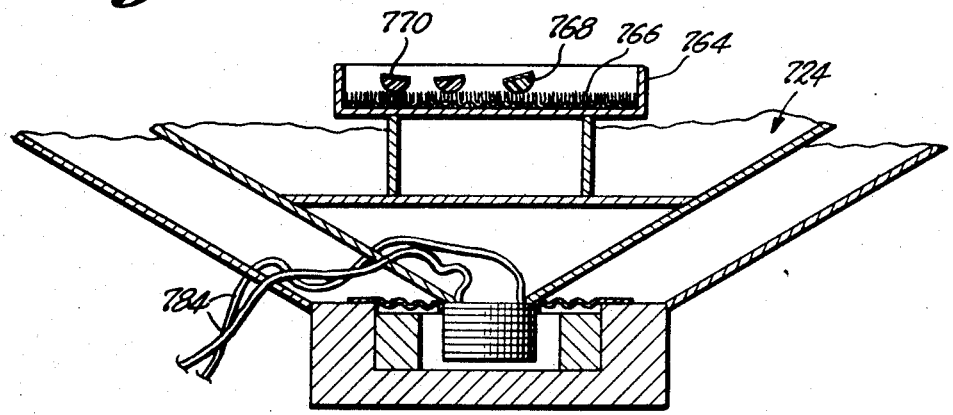
FIG. 25 is a partial section in a vertical plane on an enlarged scale through the middle portion of a transducer showing the tray and hemispherical reflecting particles or elements thereon and illustrating the manner in which such particles are supported for free rocking movement.
Figure 26:
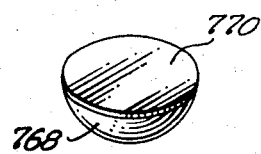
FIG. 26 is a top perspective of a hemisphere, showing mirror surface thereon.

In its preferred form the tray 764 is lined with a suitable fabric material having a slight pile on its upper side as indicated at 766 in FIG. 25.

While any suitable form of light reflecting elements may be placed in the tray to rest upon the pile 766 of the tray lining material, it is found that most satisfactory results are obtained by employing hemispheres of plastic or other suitable light material as indicated at 768, having the flat surfaces or faces thereof highly polished or having thin reflectors 770 upon the flat surfaces and in the operation of the mechanism these hemispheres are placed with the flat reflecting surfaces upward as illustrated.

The rotary solenoids 756 have coil springs operatively connected to the shafts 758 thereof, which are biased in a manner to swing the arms 760 outwardly so as to remove the silhouette forming apertured plates 762 out of the light beam when the solenoid coil is de-energized. These rotary solenoids are connected in suitable electric circuitry to facilitate selective energization of the solenoids to place any desired one of the silhouette templates in operative position in the light beam whereby the desired configuration of the silhouette will be projected onto the reflective surfaces 770 of the tray carried particles to be projected from such surfaces onto the picture area P.

The selection of the templates for movement into the path of light of any one or more than one of the light projectors may be effected manually as hereinafter described or means is provided, as hereinafter disclosed, for effecting the movement of the templates into the light beams automatically by means of a previously programmed magnetic tape.

In the first described embodiment of the invention there is set forth a means for effecting the movement or agitation of light reflecting particles in a single tray in response to the tempo or changes in tempo of music recorded upon and reproduced from a conventional record on a conventional record player. Also a single light unit is shown for projecting a beam of light upon the particles in the tray and in one form of the disclosure the light projector is shown having a single template removably positioned in the lens housing for projecting a contoured or formed light beam upon the reflecting particles.

In the presently described embodiment of the invention in which are shown four separate transducer units each having a speaker connected in parallel therewith, with a light projector for each transducer unit, equipped with a number of templates designed to be moved into the light beam, use is made of a multi-track magnetic tape recording and reproducing mechanism which, as is shown in FIG. 20, is capable of transmitting music or other desired sounds in four different frequencies or from each of four different frequency tracks.

In FIG. 20 the diagrammatic illustration of the four track tape recording and reproducing unit, generally designated 702, is illustrated as having a low frequency track 774, designated Track 1; a medium frequency track 776; a mid-range track 778, designated Track 3 and a high frequency track 780, designated Track 4.

Each of these frequency tracks is electrically connected with one speaker-transducer pair or combination as shown in FIG. 20, the speaker coils of each combination being connected in parallel as shown in which case the electrical impulse produced by recording from track 1, for example, passes in part to the speaker coil of the unit 714 and in part to the speaker coil of the transducer unit 724 to simultaneously actuate the coils of these units and there is provided in each of the two circuits 782 and 784 connected respectively with the cone driving coil of the speaker 714 and the driving coil of the transducer unit 724, a knob actuated unit 786 for controlling the volume of sound from the music reproducing speaker and a knob actuated unit 788 for controlling the current flow to the transducer and accordingly the activity of the reflecting elements in the transducer tray.

For clarity of illustration, and convenience of description, the knobs for units 786 and 788 are shown in FIG. 20 as though one above and one below the speaker, whereas a preferred positioning would be as seen in FIG. 19.

Figure 21:
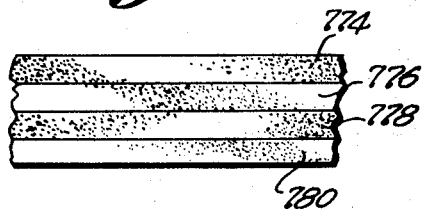
FIG. 21 is a simple diagrammatic plan of a four track tape such as would be employed in the mechanism illustrated in FIGS. 19 and 20, where, as in FIG. 20, one of four pairs of speaker-transducer units is illustrated electrically connected with the low frequency track of the tape.

From the diagram of FIG. 20, showing the one track control connection for one speaker unit and its associated transducer, it will be apparent that similar connections are made between each of the tracks 2, 3 and 4 and one of the remaining three speaker-transducer combinations. Thus by providing each track of the four channel magnetic tape such as is illustrated in FIG. 21 with a desired programming by which low, medium, mid-range or high frequency impulses may be supplied along with music from musical instruments, to the different transducers, the light reflecting elements 768 may be moved or agitated at different rates or with different degrees of intensity. By this means it is possible to illustrate the different frequencies of sound in the direction on the screen or picture area, in accompaniment with music.

The illustrated four track magnetic tape recorder is primarily to separate the high and low frequency sound waves. If one channel were used and a low frequency is produced by an instrument such as a drum or a base fiddle, the half sphere reflectors will be moved so violently that high frequencies from a violin recording do not get the proper response in the tray where the reflectors are located. Accordingly, by using the four different spotlights and the four transducer speaker heads with the reflecting mirrors, it is possible to visualize from the character of the movements of the reflections projected onto the picture area, all of the sound wave frequencies with some of the reflections moving rapidly in response to the frequency of one instrument and other reflections moving at a different rate in response to the frequencies of another instrument.

The activity control unit or rheostat 788 may be employed to control or vary the activity or violence of movement of the light reflectors while the volume control rheostat 786 will, of course, control the volume of the music emitted from the music reproducing cone or speaker.

As hereinbefore stated, electric circuitry is provided for effecting the manual control or energization of the rotary solenoids of each of the four light projectors and FIG. 28 illustrates the circuitry by which this manual control of the solenoids on the four light projectors of FIG. 19, is effected where, by manipulation of one or the other of two switches, any one of the four templates of a selected light projector may be introduced into the beam of light directed from that projector downwardly onto the reflecting hemispheres in the transducer carried tray 764 at which the light beam is directed or aimed.

The rotary solenoids are connected in and controlled by a circuit arrangement separate from the electrical circuits of the magnetic tape player mechanism. This separate circuit for controlling the solenoids of one light projector is illustrated in FIG. 28, where, by the rectifier system generally designated 790, alternating current supplied to the switch controlled circuits, is changed to the required direct current of the proper voltage.

The rectified current is fed through the supply wire 792 to the center of a distributing line 794.

The numerals 796 and 798 designate single pole, double throw switches, each of which has the switch blade or pole thereof connected to the current supply line 794 at one side of the DC supply 792.

Each of these manually actuated switches 796 and 798 is adapted to supply operating current to one side of either of two of the rotary solenoids as, for example, switch 796 may be adjusted to supply current through line 800 or line 802 to one side of either of two rotary solenoids, return flow of the current from the other side of the solenoids being by way of the line 804. Likewise, manual switch 798 may convey current by way of either of the lines 806 and 808 to one side of each of the remaining two rotary solenoids of the group of four on the light unit, the return flow of current also being by way of the conductor 804.

Actuating knobs for the manual switches of the four light projecting units may be located in a group at a suitable position as, for example, on a console as indicated at 712 in FIG. 19. Here an attendant can readily select and project into any one or all of the light beams of the light projectors, desired templates cut out to reproduce the reflection upon the picture area of any desired subject. As an example, if the music being reproduced at the speakers may include primarily violins and drums, the templates may be formed to reproduce pictures of these instruments on the picture area, the pictures moving at the appropriate rate or appropriate degree of activity for the frequencies of the instruments being heard.

While there may be some overlapping of the reflected figures upon the picture area or screen, all of the figures of the different template subjects will be clearly seen.

The preceding description of the embodiment of the invention using the rotary solenoids for introducing the silhouette templates into the light beams, has been directed to use of four spotlights as illustrated in FIG. 19, with a speaker-transducer pair of units associated with each of the spotlights. Also there has been illustrated and described a magnetic tape recorder and reproducer apparatus having four bands or tracks each electrically connected with a speaker-transducer pair of units and the electrical system operatively connected with the rotary solenoids for electrically energizing the solenoid has been described and illustrated as manually controlled by the use of a pair of single pole-double throw switches for each light projector, each switch controlling the operation of two rotary solenoids.

As hereinbefore stated the magnetic tape recorder and reproducer mechanism may be used to actuate the rotary solenoids of each spotlight associated with a speaker-transducer pair of units by having one channel, band or track of the magnetic tape connected with the electrical system in which each of the spotlights and the rotary solenoids associated therewith, are connected.

FIG. 29 illustrates a set-up corresponding to that illustrated in FIG. 19 in which three speaker-transducer pairs of units are employed to be controlled by three bands or tracks of the magnetic tape recording mechanism, such, for example, as the low frequency band or track, the mid-range track and high frequency track, a fourth channel or track being utilized to actuate the rotary solenoids of the light projectors in coordination with the frequency pulses transmitted to the pairs of speaker-transducer units.

Referring particularly to FIGS. 29 and 30, there is shown a cabinet generally designated 810 and corresponding to the cabinet 700 for housing the pairs of speaker-transducer units and other necessary electrical parts, not shown, which housing or cabinet is set up or of suitable form or configuration to house three pairs of the units.

The cabinet 810, like the cabinet 700, has a top wall 812 having suitable openings therein as indicated at 814 for exposing the upwardly facing or directed transducer units, each of which is here generally designated 816 and corresponds with the unit 724 shown in FIG. 20, the units being mounted upon the underside of the cabinet top wall 812 as will be readily understood.

Each of the three side walls 818 has mounted thereon within the cabinet, a speaker unit corresponding to the speaker units 714, 716, 718 and 720 hereinbefore described, the single reference character 820 here being used to designate each of the speaker units shown in FIG. 30. The speaker-transducer units 820 and 816 are electrically connected in pairs as hereinbefore described for the speakers and transducer units for the previously described set up wherein four pairs of such units are employed with four of the light projectors.

The electrical connections between the pairs of speaker-transducer units and the tracks or channels of the magnetic tape control mechanism is the same as illustrated in FIG. 20 and each pair of units is connected with a control channel of a magnetic tape control mechanism as indicated at 822. This mechanism is shown in FIG. 30, however, as having three bands for low, medium and high frequency tones or sounds, there being a fourth frequency band as indicated at 824 designated "silhouette channel" which automatically controls the actuation of the rotary solenoids carried by the light projectors, in correspondence with the frequency impulses sent to the different pairs of speaker-transducer units. The automatic control means provided by the silhouette channel or band of the magnetic tape recorder mechanism replaces the manual control means in the form of the manual switches illustrated in FIG. 28.

FIG. 31 illustrates an electrical system by means of which the rotary solenoids associated with one of the spotlights or light projectors are automatically actuated under the control of the silhouette channel of the control mechanism 822.

The electrical system of this FIG. 31 is designed to control or actuate automatically the rotary solenoids of the three light projectors shown in the group forming FIG. 29 and accordingly the magnetic tape control mechanism 822 is illustrated as having three frequency bands, one for each pair of speaker-transducer unit of the arrangement shown in FIG. 29 while the fourth band or channel designated 824 controls the rotary solenoids carried by the three light projectors as hereinbefore stated.

As shown, the magnetic tape control or silhouette channel 824 is electrically connected in the electrical system for actuating a switch by means of which current is automatically distributed to the rotary solenoids associated with a light projector unit. It will be understood, of course, that the system shown in FIG. 31 is duplicated for each of the two additional light projector units or the rotary solenoids carried thereby, the system illustrating the connections for the rotary solenoids of one light projector unit only but it will be obvious that the silhouette channel tape is prepared or programmed to actuate rotary solenoids of three units in coordination with the type of frequency produced by the different tracks of the magnetic tape mechanism for actuating the speaker-transducer pairs of units.

In the electrical system shown in FIG. 31 for the rotary solenoids of one light projector, the numeral 826 generally designates a stepping switch which when energized under the control of the silhouette channel track or band of the multi-track magnetic tape, will cause electric current to be fed to a side of one of the rotary solenoids illustrated.

The circuit arrangement as shown is designated or laid out for feeding current to one side of each of four rotary solenoids according to directions received from the silhouette channel of the tape.

The switch 826 has the arm or blade 828 electrically connected with the supply side of a rectifier unit 830 and when the switch blade is moved to different operative positions, electric current will be supplied to appropriate terminals or taps 832 to be sent to one side of a rotary solenoid by way of conductors 834, 836, 838 and 840. The numeral 842 designates the return side of the circuit from the several rotary solenoids.

Actuation of the blade or arm 828 of the stepping switch is effected by the step coil 844 and returned to starting position by the reset coil 846.

In accordance with the preceding description it will be obvious that the leads 848 of the stepping switch, not shown connected with conductors leading to rotary solenoids, would be connected into the appropriate circuits for the remaining template operating rotary solenoids of other light projectors not illustrated in the circuit diagram.

While in the system shown in FIGS. 29, 30 and 31 a three channel magnetic tape control mechanism has been designated and described while in connection with the previously described system a four channel magnetic tape mechanism has been illustrated and referred to, it will be readily obvious that use may be made of tapes having a different number of tracks or bands from those described which would be appropriately connected electrically with speaker-transducer pairs or combinations of units to operate in a system in association with one "silhouette channel" operating in association with the speaker-transducer controlling tracks, whereby as the different frequencies are supplied to the speakers and to the transducers, appropriate actuation will be imparted to the silhouette forming templates by energization of the controlling solenoids or appropriate solenoids therefor.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An entertainment device, comprising an electrical transducer embodying a substantially horizontal upwardly opening flexibly supported cone, electrical driving means associated with the cone for imparting, when energized, pulsating movements thereto, electrical sound reproducing mechanism including a speaker for converting oscillating electric current input into audible sound, means for transmitting said oscillating current to said transducer cone driving means whereby said speaker and transducer are connected in parallel and function as a pair to produce audible sound together with said pulsating movements of said cone, a member mounted upon said cone a plurality of light reflecting elements, means upon said member on the cone supporting said elements for relatively free movement in response to said pulsating movements imparted thereto by said cone, said elements having a reflecting surface, light beam projecting means for directing a light beam downwardly at an angle onto the reflecting surfaces of said elements for producing and projecting onto a receiving surface reflections from said elements moving synchronously with the tempo of sound produced by said sound reproducing apparatus, and a template silhouette forming means disposed adjacent said light beam projecting means and in the light beam, said template silhouette forming means having a silhouette forming opening therein, whereby the light beam has the configuration of said silhouette to reflect the silhouette from the surfaces of said elements.

2. Apparatus as defined in claim 1, wherein the means upon said member supporting said elements includes a resilient pile, said elements having a hemispherical form and lying with the rounded side thereof on said pile with the reflecting surfaces facing upwardly.

3. Apparatus as defined in claim 1 including means for removably positioning said template silhouette forming means in said light beam.

4. The invention as defined by claim 1, wherein the said means supporting said elements consists of a multiplicity of strands connected to and disposed at an elevation above said member and wherein said light reflecting elements are attached to said strands.

5. The invention as defined by claim 1, wherein said element supporting means consists of a multiplicity of relatively long flexible strands attached at one end to said member and having the other ends thereof attached to another support means located at an elevation above the first attached ends thereof with said light reflecting elements attached to said strands.

6. The invention as defined by claim 1, wherein said element supporting means consists of a multiplicity of relatively long flexible strands attached at one end to said member and a circular supporting means supported at an elevation above the member, with said flexible strands having their other ends attached to the said circular supporting means and wherein said light reflecting elements are carried by and are distributed along the length of said strands.

7. The invention as defined by claim 1, wherein said light beam projecting means comprises a housing having a lens carrying light tube, a lens therein, light producing means in the housing, said light tube being positioned to direct a light beam onto said light reflecting elements, and means for supporting the template in and transversely of said light beam for shaping the light beam striking and reflected from the said reflecting surfaces.

8. The invention as defined by claim 1 wherein said light beam projecting means comprises a housing having a lens carrying light tube, a lens therein, light producing means in the housing, said light tube being positioned to direct a light beam onto said light reflecting elements, said template silhouette forming means including a plurality of light beam shaping templates, means supporting each of said templates for movement into and transversely of said light beam for shaping the light beam striking and reflected from said reflecting surfaces, and means for selectively introducing said templates into the light beam.

9. The invention as defined by claim 1 wherein said light beam projecting means comprises a housing having a lens carrying light tube, a lens therein, light producing means in the housing, said light tube being positioned to direct a light beam onto said light reflecting elements, said template silhouette forming means including a plurality of light beam shaping templates, means pivotally supporting each template for swinging movement into an operative position in said light beam for shaping the light beam striking and reflected from said reflecting surfaces, individually energizable electrical solenoids each associated with a template supporting means for swinging the latter, and means for selectively enerizing said solenoids.

10. The invention as defined by claim 1, with additional speaker-transducers whereby are provided a plurality of pairs of speaker-transducers, said additional speaker-transducer pairs and the first said speaker transducer pair being adapted for energization simultaneously by said sound reproducing mechanism, said electrical sound reproducing mechanism being adapted to transmit electrical impulses to said speaker-transducer pairs at different pre-selected frequencies, and there being additional means for directing light beams downwardly through additional silhouette forming means at angles corresponding to the angle of projection of the first said light directing means, said projection angles of said light directing means being convergent toward respective transducers of said speaker-transducer pairs, and each said additional light directing means and said first light directing means being positioned to direct its light beam onto light reflecting elements associated with a respective transducer of a pair of said speaker-transducers.

11. The invention as defined by claim 10 wherein the said sound reproducing mechanism is a multitrack magnetic tape recorder and reproducer.

12. The invention as defined by claim 1, with additional speaker-transducers whereby are provided a plurality of pairs of speaker-transducers, said additional speaker-transducer pairs and the first said speaker-transducer pair being adapted for energization simultaneously by said electrical sound reproducing mechanism, said electrical sound reproducing mechanism being adapted to transmit electrical impulses to said speaker-transducer pairs at different pre-selected frequencies, there being additional means for directing light beams downwardly at angles corresponding to the angle of projection of the first said light directing means, said projection angles of said light directing means being convergent toward respective transducers of said speaker-transducer pairs and each said additional light directing means and said first light directing means being positioned to direct its beam onto light reflecting elements associated with a transducer of a pair of said speaker-transducers, the said sound reproducing mechanism being a multi-track magnetic tape recorder and reproducer, and there being shiftable template silhouette forming means associated with each of said light directing means and adapted to be introduced into their respective light beams for shaping the associated light beam striking and reflected from said light reflecting elements.

13. The invention as defined by claim 12, wherein the said shiftable template silhouette forming means associated with each light directing means comprises a number of templates each carried by a pivoted arm, and a rotary solenoid operatively connected to each pivoted arm, each solenoid when energized swinging the arm connected thereto to move the template into the beam of the associated light directing means, said solenoids including means when de-energized to reversely swing the associated arm, and electrical circuitry having said solenoids therein and including control means for selectively energizing the solenoids, said templates being designed to form a silhouette for reflection from said reflecting elements having a meaningful relationship with sound recorded on and reproduced by the speakers of the sound reproducing mechanism.

14. The invention as defined by claim 13 wherein said means for selectively energizing said solenoids consists of manually operated switching means in said circuitry.

15. The invention as defined by claim 13, wherein said means for selectively energizing said solenoids comprises stepping relay actuated switching mechanism in said circuitry electrically connected with and receiving operating electrical impulses from a silhouette channel or track, of said multi-track magnetic tape.

References Cited

UNITED STATES PATENTS

| | | | |
|---|---|---|---|
| 2,677,297 | 5/1954 | Wetzel | 84—464 |
| 2,959,094 | 11/1960 | Kosma | 353—62 X |
| 3,146,665 | 9/1964 | Domeshek et al. | 272—10 X |
| 3,318,187 | 5/1967 | Prohaska | 84—464 X |
| 1,908,203 | 5/1933 | Wilfred. | |
| 2,121,838 | 6/1938 | Stewart. | |
| 2,411,804 | 11/1946 | Plebanek. | |
| 2,607,269 | 8/1952 | Elsaesser. | |
| 3,048,075 | 8/1962 | Wright. | |

ANTON O. OECHSLE, Primary Examiner

A. W. KRAMER, Assistant Examiner

U.S. Cl. X.R.

128—2.05; 272—8; 353—62